United States Patent Office 3,320,319
Patented May 16, 1967

3,320,319
1-(ARYL)-2-METHYL-2-ALIPHATIC AMINO-PROPANES
Wilhelm Alfons Schuler, Bad Homburg, and Helmut Beschke, Frankfurt am Main, Germany, assignors to Deutsche Gold- und Silber-Scheideanstalt vormals Roessler, Frankfurt am Main, Germany
No Drawing. Filed Aug. 6, 1965, Ser. No. 477,947
Claims priority, application Germany, Mar. 29, 1961, D 35,763; May 29, 1964, D 44,564
4 Claims. (Cl. 260—570.8)

This is a continuation-in-part of application Ser. No. 402,965, filed Oct. 9, 1964, which in turn is a continuation-in-part of application Ser. No. 332,303, filed Dec. 20, 1963, a continuation-in-part of application Ser. No. 177,192, filed Mar. 5, 1962, all of which are now abandoned.

The present invention relates to novel substituted alkyl amines having an appetite depressing action with particularly low or no central nervous stimulating side effects. The novel compounds according to the invention are of the following formula:

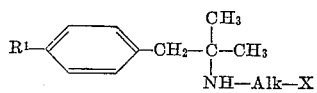

in which $R^1$ is halogen, such as chlorine, fluorine and bromine, Alk is alkylene having 2–3 carbon atoms and X is hydroxy or a halogen such as chlorine or bromine. In particular, the invention concerns the following four preferred compounds which, while having a good appetite depressing action, have no discernable stimulating effect upon the central nervous system.

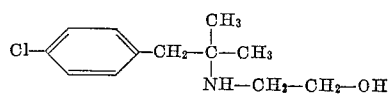

1-(p-chlorophenyl)-2-methyl-2 - (2-hydroxyethylamino)-propane

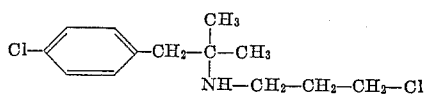

1-(p-chlorophenyl) - 2 - methyl-2-(3-chloropropylamino)-propane

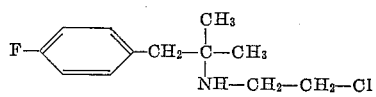

1-(p-fluorophenyl) - 2 - methyl-2-(2-chloroethylamino)-propane

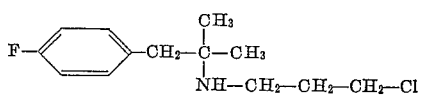

1-(p-fluorophenyl)-2-methyl - 2 - (3-chloropropylamino)-propane

The compounds according to the invention can be prepared by reacting the corresponding amino compounds of the formula

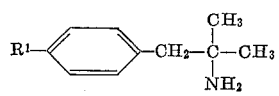

with a compound of the formula

with formation of hydrogen halide; or by reaction with an alkylene oxide, for example, ethylene oxide or propylene oxide; or by reaction with a hydroxy carbonyl compound, such as glycol aldehyde or hydroxy acetone under hydrogenating condensation conditions; or by reaction with a halogenated carbonyl compound, such as β-chloropropionaldehyde. The hydroxy group in the compounds thus produced can be replaced with halogen by any substance capable of replacing an aliphatic hydroxy by halogen, such as, for example, hydrohalic acids or thionyl chloride.

The following examples will serve to illustrate several specific embodiments of the novel compounds according to the invention. In such examples the proportions are given in parts by weight unless otherwise specified.

Example 1

37 parts of 1-(p-chlorophenyl)-2-methyl-2-amino-propane (prepared according to G. B. Bachmann, H. B. Hass and G. O. Pateau, J. Am. Chem. Soc. 76, 3973 (1954)), 20 parts ethylene chlorohydrin and 54 parts of potash in 300 parts of butanol were boiled under reflux for 6 hours while stirring vigorously. After cooling down the mixture was filtered on a suction filter, the filtrate acidified with HCl and evaporated down. The residue was then dissolved in water and shaken out with ether and the aqueous layer treated with concentrated aqueous NaOH and extracted with ether. The alkaline ether extract was dried with potash and distilled under vacuum. 23 parts of 1 - (p-chlorophenyl) - 2 - methyl-2-(2-hydroxyethylamino)-propane distilled over at 135–140° C. at a pressure of 1 mm. Hg.

Example 2

15 parts of 1-(p-chlorophenyl)-2-methyl-2-(2-hydroxyethylamino)-propane produced according to Example 1 were dissoleved in 100 parts of chloroform and such solution saturated with hydrochloric acid and heated under reflux. Then 12 parts of thionyl chloride were added in drops and the mixture boiled for an hour. Thereafter the reaction mixture was evaporated to dryness and the residue recrystallized from isopropanol containing charcoal. 12 parts of 1-(p-chlorophenyl)-2-methyl-2-(2-chloroethylamino)-propane hydrochloride of a melting point of 179–180° C. were obtianed.

Example 3

1 - (p-fluorophenyl)-2-methyl-2-amino-propane was reacted with ethylene chlorohydrin and potash in butanol as in Example 1. The 1-(p-fluorophenyl)-2-methyl-2-(2-hydroxy-ethylamino)-propane produced was recovered as in Example 1 and had a boiling range of 161–163° C. at a pressure of 1 mm. Hg.

The starting 1-(p-fluorophenyl)-2-methyl-2-amino-propane was prepared by converting p-fluorobenzyl chloride into its Grignard compound with magnesium in ether and reacting such Grignard compound with acetone to form 1-(p-fluorophenyl) - 2 - methyl-propanol-2 and converting the later compound to 1-(p-fluorophenyl)-2-methyl-2-amino-propane according to Ritter and Kalish, J. Am. Chem. Soc. 70, 4050 (1948).

Example 4

1 - (p-fluorophenyl)-2-methyl-2-(2-chloroethylamino)-propane hydrochloride of a melting point of 163–165° C. was prepared from the product of Example 3 by a process analogous to that of Example 2.

Example 5

Analogously to Example 1, 1-(p-chlorophenyl)-2-methyl-propylamine-(2) was reacted with 3-chloropropanol and potash in butanol. The resulting 1-(p-chlorophenyl)-2-methyl-2-(3-hydroxypropylamino)-propane was recovered as in Example 1 and had a boiling range of 156–163° C. at a pressure of 1 mm. Hg.

Example 6

64 parts of 1-(p-chlorophenyl)-2-methyl-2-(3-hydroxypropylamino)-propane were dissolved in 500 parts of chloroform. Such solution was then saturated with chlorine gas and subsequently 30 parts of thionly chloride were added dropwise to the solution while it was being boiled under reflux. After the addition of the thionyl chloride had been completed the mixture was refluxed for a further hour and boiled down under vacuum. The residue was recrystallized from isopropanol containing active carbon. 32 parts of 1-(p-chlorophenyl)-2-methyl-2-(3-chloropropylamino)-propane with a melting point of 161–162° C. were obtained.

Example 7

1-(p-fluorophenyl)-2-methyl-2-amino-propane was reacted with chloropropane and potash analogously to Example 1 to produce 1-(p-fluorophenyl)-2-methyl-2-(3-hydroxypropylamino)-propane of a boiling point of 176–178° C. at 1 torr. This compound was dissolved in chloroform and reacted with gaseous HCl and then with thionyl chloride analogously to Example 2. The reaction mixture was evaporated to dryness and the residue recrystallized from isopropanol to recover the hydrochloride of 1-(p-fluorophenyl)-2-methyl-2-(3-chloropropylamino)-propane of a melting point of 162–164° C.

We claim:
1. 1-(p-chlorophenyl) - 2 - methyl-2-(2-hydroxyethylamino)-propane.
2. 1-(p-fluorophenyl) - 2 - methyl-2-(2-chloroethylamino)-propane.
3. 1-(p-chlorophenyl) - 2 - methyl-2-(3-chloropropylamino)-propane.
4. 1-(p-fluorophenyl)-2-methyl - 2 - (3-chloropropylamino)-propane.

References Cited by the Examiner
UNITED STATES PATENTS

| | | |
|---|---|---|
| 2,597,247 | 5/1952 | Kerwin et al. ___ 260—570.8 XR |
| 2,597,248 | 5/1952 | Kerwin et al. _____ 260—570.8 |
| 2,600,301 | 1/1953 | Kerwin et al. ___ 260—570.8 XR |

OTHER REFERENCES

Burger: Medicinal Chemistry, 2nd edition, pages 592–620 (1960), RS403.B8.

Holm et al.: "Acta. Pharmacol. et al., Toxicol," vol. 17, pages 121–36 (1960).

CHARLES B. PARKER, *Primary Examiner.*

JOSEPH P. BRUST, *Examiner.*

R. V. HINES, *Assistant Examiner.*